(12) United States Patent
Fischer et al.

(10) Patent No.: US 8,863,608 B2
(45) Date of Patent: Oct. 21, 2014

(54) FLUID-OPERATED MANIPULATOR

(75) Inventors: Markus Fischer, Ostfildern (DE);
Ruwen Kaminski, Stuttgart (DE);
Rudiger Neumann, Ostfildern (DE);
Alexander Hildebrandt, Unterensingen (DE)

(73) Assignee: Festo AG & Co. KG, Esslingen (DE)

( * ) Notice: Subject to any disclaimer, the term of this patent is extended or adjusted under 35 U.S.C. 154(b) by 255 days.

(21) Appl. No.: 13/505,490

(22) PCT Filed: Dec. 14, 2010

(86) PCT No.: PCT/EP2010/007604
§ 371 (c)(1),
(2), (4) Date: May 2, 2012

(87) PCT Pub. No.: WO2011/082773
PCT Pub. Date: Jul. 14, 2011

(65) Prior Publication Data
US 2012/0210818 A1  Aug. 23, 2012

(30) Foreign Application Priority Data
Dec. 15, 2009  (EP) .................................... 09015514

(51) Int. Cl.
| | |
|---|---|
| *F01B 19/00* | (2006.01) |
| *F16J 3/00* | (2006.01) |
| *B25J 17/00* | (2006.01) |
| *B25J 17/02* | (2006.01) |
| *B25J 18/00* | (2006.01) |
| *B25J 9/14* | (2006.01) |
| *B25J 18/06* | (2006.01) |

(52) U.S. Cl.
CPC  *B25J 18/06* (2013.01); *B25J 9/142* (2013.01); *Y10S 901/22* (2013.01)
USPC ............................. 74/490.04; 901/22; 92/92

(58) Field of Classification Search
CPC .................. F15B 2201/411; F15B 2201/4155; F04B 43/08; F04B 45/02; F04B 43/021; B25J 9/142; B25J 17/0266; B25J 9/1075; B25J 18/06; B25J 19/0012
USPC ............ 74/490.01, 490.04; 901/22; 92/89, 92
See application file for complete search history.

(56) References Cited

U.S. PATENT DOCUMENTS 3,284,964 A * 11/1966 Saito .............................. 52/2.22
4,551,061 A * 11/1985 Olenick ........................ 414/735

(Continued)

FOREIGN PATENT DOCUMENTS

| DE | 1983340 | 2/2000 |
| DE | 102005046160 | 3/2007 |

(Continued)

*Primary Examiner* — Justin Krause
(74) *Attorney, Agent, or Firm* — Hoffmann & Baron, LLP

(57) ABSTRACT

The invention concerns a fluidically operable manipulator made up of several manipulator segments stacked along an extension curve, each comprising at least one connecting plate and at least two fluidically separated fluid chambers spaced apart on the connecting plate at right-angles to the extension curve, wherein each of the fluid chambers has at least one elastically deformable wall section which is designed to make possible, on pressurization of the respective fluid chamber with a fluid, a change in volume of the fluid chamber for a linear movement substantially parallel to the extension curve, and wherein a main extension surface of the connecting plate is provided for an arrangement at least substantially at right-angles to the extension curve, wherein the two or more fluid chambers are made integral with the connecting plate or plates.

21 Claims, 4 Drawing Sheets

(56) References Cited

U.S. PATENT DOCUMENTS

| | | | | |
|---|---|---|---|---|
| 4,784,042 | A | * | 11/1988 | Paynter ............... 91/534 |
| 5,014,515 | A | * | 5/1991 | Krauter ............... 60/581 |
| 5,351,602 | A | * | 10/1994 | Monroe ............... 92/64 |
| 6,178,872 | B1 | * | 1/2001 | Schulz ............... 92/92 |
| 6,772,673 | B2 | * | 8/2004 | Seto et al. ............... 92/92 |
| 2003/0149338 | A1 | | 8/2003 | Francois et al. |
| 2009/0314119 | A1 | * | 12/2009 | Knoll ............... 74/490.01 |

FOREIGN PATENT DOCUMENTS

| | | |
|---|---|---|
| WO | WO9635877 | 11/1996 |
| WO | WO0117731 | 3/2001 |
| WO | WO 2008046566 A1 * | 4/2008 |

* cited by examiner

FLUID-OPERATED MANIPULATOR

This application claims priority based on an International Application filed under the Patent Cooperation Treaty, PCT/EP2010/007604, filed Dec. 14, 2010, which claims priority to EP09015514.4, filed Dec. 15, 2009.

BACKGROUND OF THE INVENTION

The invention relates to a fluidically operable manipulator made up of several manipulator segments stacked along an extension curve, each comprising at least one connecting plate and at least two fluidically separated fluid chambers spaced apart on the connecting plate at right-angles to the extension curve, wherein each of the fluid chambers has at least one elastically deformable wall section which is designed to make possible, on pressurisation of the respective fluid chamber with a fluid, a change in volume of the fluid chamber for a linear movement substantially parallel to the extension curve, and wherein a main extension surface of the connecting plate is provided for an arrangement at least substantially at right-angles to the extension curve.

Known from DE 198 33 340 A1 is a worm-like operating mechanism which is pivotable and adjustable in its length. The operating mechanism comprises three actuators, each made up of a row of adjacent pockets or cushions which may be filled with a gaseous or liquid pressure medium. The actuators, made of a flexible, limp material, are attached to dimensionally stable support structures, which serve to maintain spacing between the actuators and help determine the external shape of the operating mechanism.

WO96/35877 discloses an actuating organ built up from a multiplicity of dimensionally stable support elements lined up side by side, and pump organs made of a flexible material, formed along the stacking direction of the support elements. Through the application of pressure from a pressurised fluid to at least one of the pump elements, a curvature of the actuating organ may be obtained.

The problem of the invention is to provide a fluidically operable manipulator which has a simple manner of construction.

SUMMARY OF THE INVENTION

This problem is solved for a fluidic manipulator of the type described above by the features of claim 1. Here it is provided for the two or more fluid chambers to be made integral with the connecting plate or plates.

Because of the integral design of fluid chambers and connecting plate, a flow of force between the elastically deformable wall sections of the fluid chambers and the dimensionally stable connecting plate may be so configured that stress peaks in the elastically deformable wall sections are avoided, so that fatigue strength of the manipulator is ensured even after a high number of duty cycles. Preferably the deformation properties of the elastically deformable wall sections on the one hand and the dimensionally stable connecting plate on the other hand are preset by varying material thickness. In addition it is also possible to provide three-dimensional support structures, in particular lattice-type structures, on the dimensionally stable connecting plate, in order to obtain high rigidity even with low weight and low material consumption. A further positive effect of the integral design of fluid chambers and connecting plate lies in the fact that the fluid chambers may be sealed easily since, in particular at the transition between fluid chamber and connecting plate, no additional sealing measures are necessary on account of the integral construction. The fluid chambers and connecting plate are described as integral in particular when they are made of standard material in a common production process.

Advantageous developments of the invention are the subject of dependent claims.

It is expedient if preferably elastically deformable wall sections of the fluid chambers are provided for a connection, in particular integral, between adjacent connecting plates. This gives the fluid chambers a dual function since, besides providing an at least substantially linear extension movement on pressurisation with a fluid, they are also used for the physical connection of adjacent connecting plates. This makes it possible to dispense with an additional outer and/or inner support structure, thereby ensuring a simple design of the manipulator according to the invention. Preferably the wall sections of the fluid chambers are at least almost completely elastically deformable, so that at least a considerable part of the fluid chamber can be deformed through the application of pressure from a liquid or gaseous fluid, to obtain a change in volume of the fluid chamber. In contrast the connecting plates are so designed that, during pressurisation of the fluid chambers, they undergo no significant change in shape, and may therefore be described as dimensionally stable. Especially advantageous is a design in which the fluid chambers are integral with adjacent connecting plates. This makes it possible to dispense with costly sealing measures between the fluid chambers and the connecting plates. Moreover, the integral design ensures easy transfer of force between the fluid chambers and the connecting plates.

It is advantageous if fluid chambers of adjacent manipulator segments arranged along the extension curve are connected so as to communicate with one another. This makes possible, in a simple manner, joint pressurisation of several fluid chambers with pressure fluid via a common feed line. The fluidic pressurisation can effect a change in volume of the respective fluid chambers which is expressed an expansion or contraction of the fluid chambers, through which a change in length of the fluid chambers may be generated at least substantially parallel to the extension curve.

In a development of the invention it is provided that fluid chambers of adjacent manipulator segments arranged along the extension curve are fluidically separated and may be controlled separately. With selective control of the fluidically separated fluid chambers, especially sensitive deflection of the manipulator may be obtained. In addition, through constant application of pressure, individual fluid chambers of the manipulator may be held at a preset volume expansion or length extension, by which mean the manipulator may for example be biased in a presettable direction in space.

It is advantageous if at least one guide means to hold a sensor component of a curvature sensor is provided on a radially outer surface of the connecting plate. This facilitates simple and cost-effective attachment of at least one curvature sensor on the manipulator. With the aid of the curvature sensor it is possible to determine for example a local curvature of the manipulator between two connecting plates or a global curvature of the manipulator over its entire length or over a part of its length. Preferably the guide means are provided to hold a sensor component for length measurement, for example a strain gauge, a linear potentiometer, a solenoid assembly or a control cable connected to a length measuring device.

In a further development of the invention it is provided that the manipulator segments are made by a generative production method, in particular by means of selective laser sintering. A generative manufacturing process involves forming, with the manipulator segments being produced directly without the use of tools by the input of energy into a formless compound, for example a reaction resin or a plastic or metal powder, in particular in layers. An example of such a process is selective laser sintering, in which a laser beam binds a thin powder layer into a cohesive structure through localised fusion. Of advantage in the use of generative production methods is that changes in the geometry of the manipulator segments may be made easily by altering the dataset used for the manufacturing process, for example CAD data. This gives a high degree of flexibility for the application-specific modification of the manipulator segments. It is also easy to produce undercut shapes when using generative production methods.

It is expedient if cross-sections of the manipulator segments determined by the fluid chambers and the connecting plate are tapered along the extension curve in cross-sectional planes aligned at right-angles to the extension curve. Tapering of the lined-up manipulator segments along the extension curve helps achieve an optimum weight for the manipulator. Preferably at a distal section of the manipulator, i.e. distant from an anchorage point of the manipulator, at which in particular a tool or tool holder is attached, the manipulator segments are provided with a smaller cross-section than at a proximal section of the manipulator, directly adjacent to the anchorage point. This is associated with the fact that, at the proximal section, in addition to the forces to be transferred from the manipulator to a tool or workpiece, the weight of the distal section must also be supported.

It is advantageous when the connecting plate has between the fluid chambers a recess which is preferably designed to feed supply lines along the extension curve. The recess facilitates the laying of supply lines, in particular fluidic and/or electrical supply lines, close to the neutral fibre of the manipulator. The neutral fibre is that extension curve of the manipulator which undergoes no change in length when the manipulator is curved. By laying the supply lines close to the neutral fibre, only minimal relative movements between the supply lines and the connecting plates bordering the recess take place on curvature of the manipulator, which has advantageous effects on the resistance of the manipulator to movement and on wear of the supply lines.

Preferably the one or more elastically deformable wall sections of the fluid chamber between adjacent connecting plates is or are bellows-like, preferably rotation-symmetrical, in particular with a double-S contour. By this means it is possible to obtain an advantageous relationship between minimum and maximum expansion of the respective connecting plates, in particular in a longitudinal expansion direction. The elastically deformable wall section of the fluid chamber has during minimum expansion, which may also serve for example as a neutral position, adjacent segments with surface normals enclosing a preferably acute angle. In any change in volume of the fluid chamber leading to a change in length of the fluid chamber, starting from the minimum expansion, the adjacent segments of the elastically deformable wall section are tilted relative to one another. On reaching the maximum expansion, the surface normals of the adjacent segments are aligned at least almost parallel.

In a development of the invention it is provided that the fluid chamber is so designed that, for forces aligned parallel to the extension curve, it has a linear resistance to deformation which is considerable less than a linear resistance to deformation for forces aligned at right-angles to the extension curve. This is achieved through a suitable choice of material and geometrical dimensions, in particular of the elastically deformable wall sections of the fluid chambers. Preferably the fluid chamber is so designed that its greatest change of shape under application of pressure is aligned parallel to the extension curve, and that the linear resistance to deformation in the direction of the extension curve is a fraction, preferably less than 50 percent, in particular less than 20 percent of a linear resistance to deformation at right-angles to the extension curve. It is thereby ensured that the manipulator has high torsional strength for torques around the extension curve. Such torques lead to thrust loads on the fluid chambers. However, because of the high linear resistance to deformation of the fluid chamber in the direction of loading, these thrust loads generate only slight deformation of the fluid chamber.

In a development of the invention it is provided that several manipulator segments are combined to form a manipulator section which has on at least one end section a coupling designed for the attachment of a corresponding coupling of another manipulator section. Preferably the manipulator is formed of at least two manipulator sections, each of which may be pressurised with fluid independently of one another. It is therefore possible to produce an S-shaped curvature of the manipulator.

Adjacent manipulator sections preferably have in each case at least two separately controllable fluid chambers. By this means it is possible to achieve deflection of the respective manipulator sections in each case in at least one movement plane, preferably in two, in particular movement planes aligned at right-angles to one another. Especially preferred is the provision for at least one manipulator section of three fluid chambers, in particular arranged with a uniform angular division, separately controllable, and facilitating deflection of an end section of the manipulator section in a spherical movement space.

It is expedient if the fluidically connected fluid chambers are assigned at least one valve device. Preferably the valve device is mounted to the side of the manipulator sections, and is in communicating connection with the respective fluid chamber via at least one fluid line, which may be for example in the form of a separate hose or else a duct integrated in the fluid chambers and connecting plates.

In a development of the invention it is provided that the valve devices are linked electrically to a control unit, which is designed to control the valve devices and, by means of at least one curvature sensor assigned to at least one manipulator section, is set up for position control of an end section of the manipulator section. Through its connection with the valve devices, the control unit makes possible a targeted deformation of the manipulator section or sections through selective application of pressure to the fluid chambers, which is effected by the valve devices. To facilitate the most exact possible positioning of the distal end section of the manipulator at a presettable point in three-dimensional space, a position control for the end section is provided in which the control unit makes use of curvature signals provided by the curvature sensor or sensors. Communication between the valve devices and the control unit is preferably wireless, for example over a radio link.

It is advantageous for at least one fluid chamber to be assigned restoring means which are designed so as to assist a restoring movement of the fluid chamber against an expansion movement of the flexible wall section caused by the application of pressure. With the aid of the restoring means, the movement dynamics of the manipulator may be enhanced, since the restoring movement is accelerated from the expansion position of the respective fluid chamber due to the application of pressure to the fluid chamber into a neutral position which the fluid chamber adopts without internal application of pressure. This is due in particular to the fact that in addition to the recovery energy stored in the flexible wall section from the elastic deformation of the fluid chamber, additional recovery energy is also provided by the restoring means. Consequently the elastic recovery of the elastic wall section effected during the restoring movement, compared with an elastic recovery without suitable restoring means, may be effected in a shorter time, so achieving the desired improvement in dynamics. This is expressed in particular in higher movement speeds of the manipulator. In addition, with suitable design, the restoring means may also be used for at least partial compensation for the intrinsic weight of the manipulator, if the manipulator is used in such a way that the intrinsic weight of the fluid chambers leads to at least partial expansion of the fluid chambers without application of pressure taking place, for example if the manipulator is suspended from a ceiling.

It is especially preferred that the restoring means are designed for the provision of restoring forces which act within the fluid chamber and/or between adjacent fluid chambers. The restoring means may for example be designed for a transfer of force between opposite flexible wall sections or between the flexible wall section and a wall section with fixed shape. The restoring means may also extend over two or more fluid chambers. Preferably the fluid chambers are aligned alongside one another along the extension curve, with the restoring means connected to the respective end fluid chambers. Preferably the restoring means are also linked to the fluid chambers, which are lined up side by side between the end fluid chambers. The restoring forces of the restoring means may act either as internal forces inside the respective fluid chambers or as internal or external forces between adjacent fluid chambers.

In an advantageous development of the invention it is provided that the restoring means include at least one spring device, attached inside the fluid chamber to adjacent, in particular opposite, wall sections. The desired restoring forces may be provided in a simple manner by a spring device, for example a coil spring or a helical spring. Due to its mounting inside the respective fluid chamber, no additional space is required for the spring device, which may involve a linear, degressively or progressively acting spring.

Preferably the restoring means comprise at least one spring device which connects adjacent, in particular immediately adjacent, fluid chambers and/or connecting plates with one another. This is advantageous when the spring device is designed to be interchangeable, for example in order to make possible adaptation of the spring characteristic of the spring device to different applications of the manipulator.

It is advantageous for the spring device to have an envelope geometry with a neutral fibre, which is made geometrically similar to a corresponding section of the extension curve. In this way it is ensured that the spring device fits up compactly against the manipulator in at least almost all operating states of the manipulator, and therefore has no negative effects on the spatial expansion of the manipulator.

It is expedient if mounting areas, in particular integrally moulded on, are provided on the fluid chambers and/or the connecting plates for attachment of the spring device. The mounting areas are designed for preferably form-fitting attachment of the spring device and make possible an advantageous transfer of force between adjacent, in particular directly adjacent, fluid chambers or connecting plates. The mounting areas may for example be in the form of eyelets in which the spring ends of spring devices, in particular of helical springs, may be suspended.

In a development of the invention, the spring device is integral with at least one fluid chamber and/or connecting plate. Corresponding spring devices may be mounted on an outer surface of the fluid chamber, and additionally or alternatively may be provided in a volume section bounded by the fluid chamber. Preferably the spring devices are produced in a generative production process, in particular in a laser sintering process, together with the respective fluid chamber or with an assembly of fluid chambers and connecting plates. Especially preferred is for the spring devices to be so matched to the elasticity properties of the respective fluid chamber or group of fluid chambers that the spring devices are biased towards an unpressurised rest position of the fluid chamber leading to a preferred position of the fluid chamber.

It is advantageous when the restoring means include a partial vacuum device, which is designed to provide a partial vacuum at one or more of the fluid chambers. With the aid of the partial vacuum device, in addition or alternatively to the action of the spring device, a restoring force may be obtained through partial vacuum pressurisation of a fluid chamber or group of fluid chambers. In addition, during partial vacuum pressurisation of the fluid chamber, active venting takes place, so that the fluid volume taken up by the fluid chamber may be withdrawn more rapidly from the manipulator sections, leading to faster recovery of the fluid chamber into the neutral position. Through the combined action of the faster venting of the fluid chamber and the additional option of supplying the fluid chamber with partial vacuum, in order to generate a presettable preferential setting of the fluid chamber, the dynamics of the manipulator may be enhanced in an advantageous manner.

Preferably the partial vacuum device has a fluidic connection with the valve device, in particular with an outlet air duct of the valve device, to allow partial vacuum pressurisation of the assigned fluid chamber depending on the valve position. In this way an advantageous fluidic connection is obtained between the partial vacuum device and the respective fluid chamber or group of fluid chambers. Additional fluid lines to provide the partial vacuum to the fluid chamber or group of fluid chambers are not required; instead it is possible to effect the entire fluid supply to and fluid removal from the fluid chamber through a single fluid line.

It is advantageous if the partial vacuum device is designed for control by the control unit, in order to allow provision of partial vacuum depending on an operating state of the respective valve device. By this means, targeted provision of partial vacuum may be made in each case at that point in time when a resetting of the respectively assigned fluid chamber or group of fluid chambers is required. This is coordinated by the control unit, which activates the partial vacuum device according to the partial vacuum requirement. The partial vacuum device may involve for example a partial vacuum operating on the ejector principle, which provides a partial vacuum to the respective fluid chamber or group of fluid chambers during a through flow of pressurised fluid. Preferably, in this case, the supply of pressurised fluid to the partial vacuum device is controlled by a valve means acting in conjunction with the control unit, so that altogether more energy-efficient operating of the manipulator may be ensured.

BRIEF DESCRIPTION OF THE DRAWINGS

An advantageous embodiment of the invention is depicted in the drawing, which shows in.

DETAILED DESCRIPTION OF THE PREFERRED EMBODIMENTS

Figure 1:
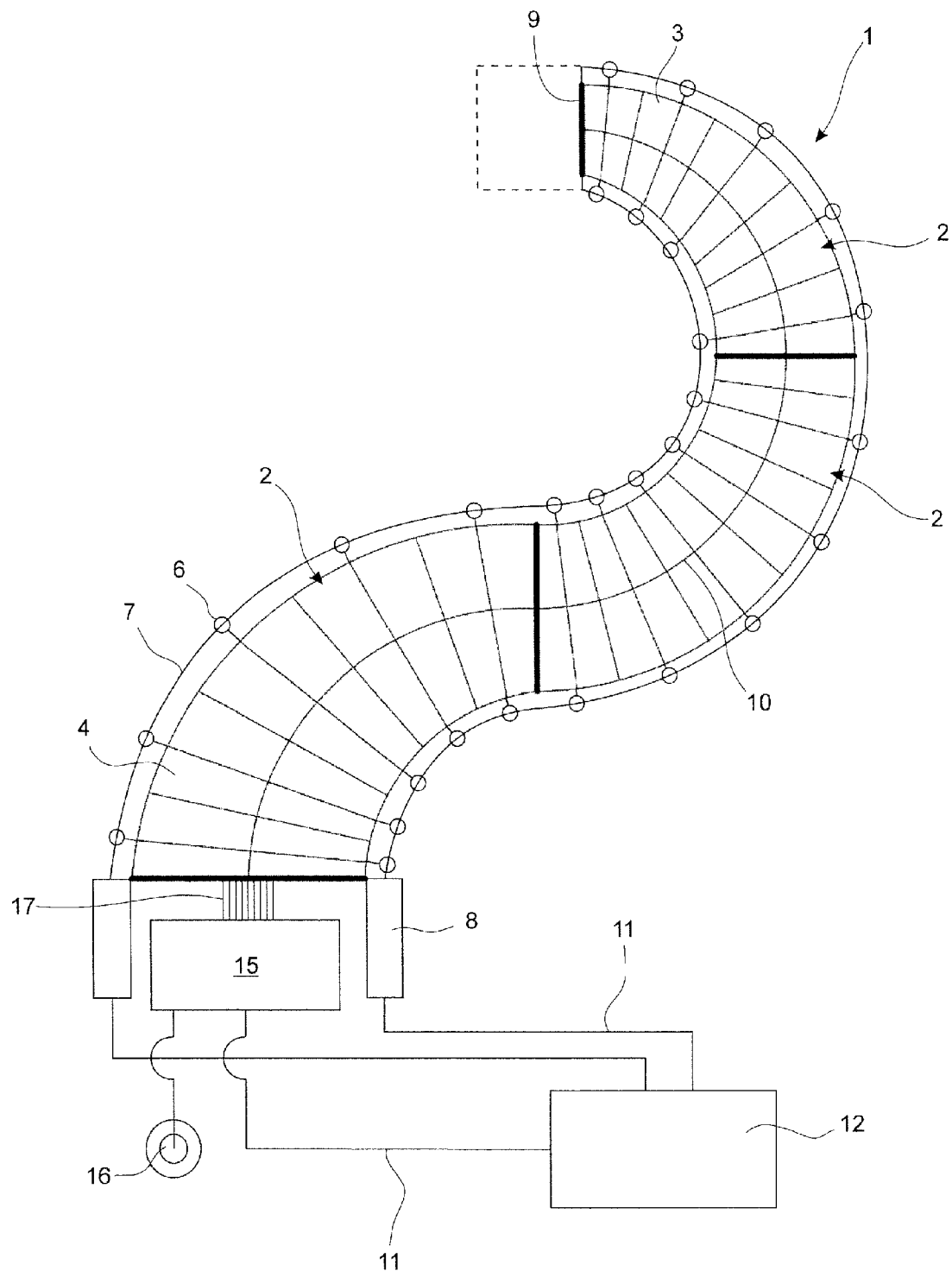
FIG. 1 a schematic view of a manipulator made up of three manipulator sections in a functional position FIG. 2 a perspective view of a manipulator section, made up of a multiplicity of one-piece manipulator segments lined up together FIG. 3 a sectional view of the manipulator section according to FIG. 2

A manipulator 1 shown in FIG. 1 is trunk- or worm-like in form and by way of example is formed of three manipulator sections 2 arranged in series. The manipulator 1 is used for the positioning of a tool holder, tool carrier or tool, not shown, which may be attached to a distal end section 3. Each of the manipulator sections 2 may be curved around two movement axes aligned at right-angles to one another, by pressurisation of fluid chambers explained in detail below. In addition, with suitable control, it is possible to lengthen or shorten the respective manipulator section 2 in an axial direction of extension. Thus, each of the manipulator sections 2 allows a movement of the respective distal end section in a movement space bounded by two spherical shell sections aligned concentrically to one another. Through the linking of three manipulator sections 2 in the present embodiment of the manipulator 1, points in three-dimensional space may be driven by orientations, differing from one another, of the distal end section 3 of the manipulator 1. In this way, flexible use of the manipulator 1 for a variety of handling operations is ensured.

As shown only schematically in FIG. 1, and explained below in more detail with reference to FIGS. 2 and 3, each of the manipulator sections 2 is made up of a multiplicity of manipulator segments 5 lined up and connected together so as to form a single unit. Provided on radially outer surface areas of the manipulator segments 5 are guide means 6, shown by way of example as guide eyelets, in particular integral. The guide means 6 serve to guide sensor components 7, which by way of example are in the form of control cables. The sensor components 7 are connected to curvature sensors 8 located at the proximal end section 4 of the manipulator 1, and fixed to a coupling plate 9 of the distal end section 3.

The curvature sensors 8 are preferably in the form of position sensors, and determine the curvature-determined relative movement of the respective sensor components 7 during movement of the manipulator 1, in order to produce position data. In the illustrated embodiment of the manipulator 1, two curvature sensors 8 are provided, preferably arranged at the same angular division and the same radial distance from the extension curve 10. The extension curve 10 coincides preferably with a neutral fibre of the manipulator 1, which involves a spatial line inside the manipulator 1 which undergoes no change in length during curvature of the manipulator sections 2. The shape of the neutral fibre and the extension curve 10 alter with the curvature of the manipulator sections 2. In a neutral position, not shown, of the manipulator 1, in which all manipulator sections 2 are in an uncurved state, the neutral fibre and the extension curve 10 run in a straight line.

The curvature sensors 8 are connected electrically by connecting lines 11 to a control unit 12, which processes the length data from the curvature sensors 8. From the length data, the control unit 12 determines position data with regard to the position of the distal end section 3 in three-dimensional space, and with reference to the alignment of the distal end section 3 based on its position in space. This position data may be compared by the control unit 12 with pressure values provided by pressure sensors, not shown in detail, which are assigned to the fluid chambers of the respective manipulator sections 2 and which allow determination of alignment data by the control unit.

From the comparison of the alignment data, which corresponds to a rough determination of the respective curvature of the assigned manipulator section 2, with the position data, it is possible to carry out a plausibility test. By this means the position data determined by the control unit can be saved and used as a reliable basis for planning the track of the manipulator 1, in order for example to move the distal end section from an existing position into a new position. For this purpose the control unit 12 makes use of several valve devices 15 which are linked electrically to the control unit 12 via connecting lines and are designed to block or release a pressurised fluid, in particular compressed air, at the fluid chambers of the manipulator sections 2, described in detail below.

Each of the valve devices 15 is connected on the input side to a compressed air source 16 and on the output side to a compressed-air hose 17. By way of example it is provided that the compressed-air hoses 17 are led through a central recess 18 discernible in FIG. 2 to the respective fluid chamber. Through the arrangement of the fluid hoses 17 close to the neutral fibre of the manipulator, even with sharp curvature of the manipulator sections 2, there is no or else only very little need for repositioning of the fluid hoses 17 to compensate for any changes in length of the manipulator 1.

Figure 2:
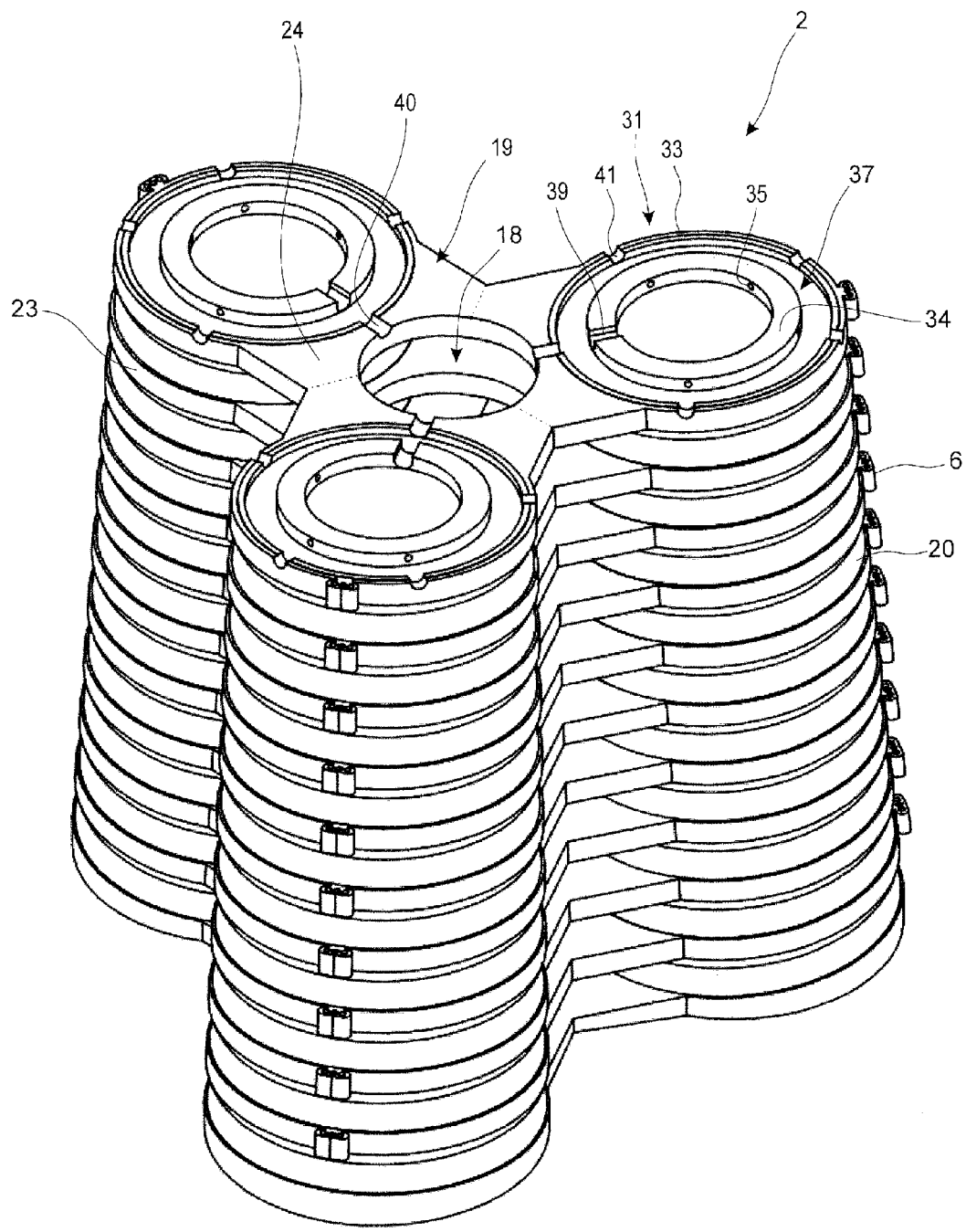
Figure 3:
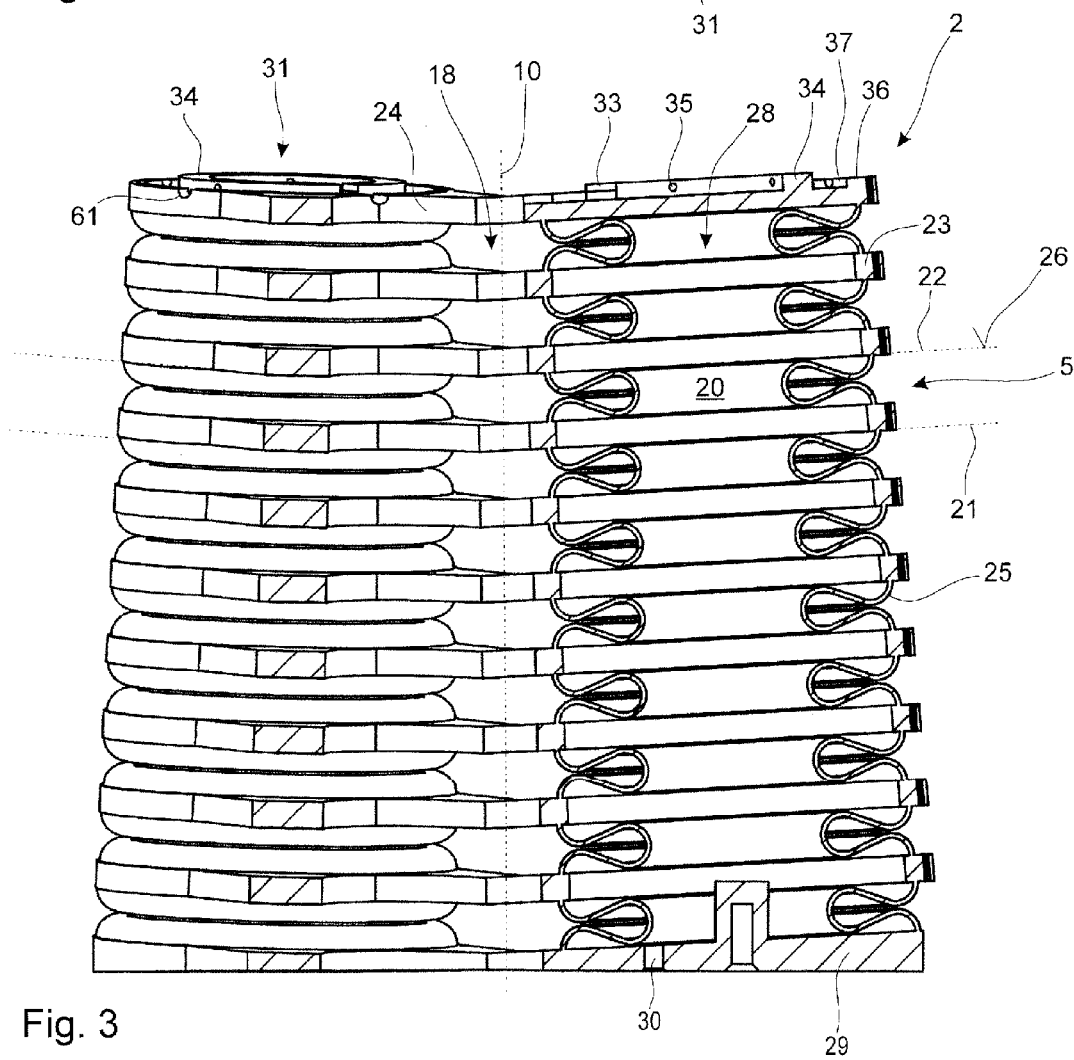

From FIGS. 1 to 3 it is evident that the manipulator 1 is tapered along the extension curve 10. By this, an optimal weight for the manipulator 1 is obtained since, at the distal end section 3, it is primarily the force reactions of the tool or workpiece, not illustrated, which must be absorbed, while at the proximal end section 4 it is also necessary to absorb the forces generated by the weight of the distal end section 3.

As disclosed by FIGS. 2 and 3, the depicted manipulator section 2 is constructed in one piece from several manipulator segments 5 lined up along the extension curve 10. In the neutral position of the exemplary manipulator section 2, as shown in FIGS. 2 and 3, the extension curve 10 runs along a straight line. In an embodiment of a manipulator section which is not shown, the extension curve in the neutral position may be curved in one or two directions in space.

For the subsequent explanation of the composition of the manipulator section 2 it is assumed that the manipulator segments 5 each comprise a connecting plate 19 to which three fluid chambers 20 are attached. The boundaries of the manipulator segment 5 so determined are indicated in FIG. 3 by broken lines 21 and 22. However this involves only one of several possible delimitations for the manipulator segments 5. In the depicted embodiment of the manipulator section 2 the connecting plate 19 is determined substantially by three support rings 23, here annular, and the webs 24 connecting the support rings 23. In a radially inner section the webs 24 bound the central recess 18, through which for example the compressed-air hoses 17 indicated schematically in FIG. 1 may be fed close to the neutral fibre. The support rings 23 and the webs 24 are so dimensioned that, when the manipulator 1 is used as intended, they are not deformed or else only to a very limited extent by the forces occurring in use, so that a clearly predictable shape of the manipulator 1 may always be ensured. In the present case the support rings 23 and the webs 24 are made of solid material. The surfaces of the support rings 23 and the webs 24 facing the integrally moulded fluid chambers 20 form a main extension surface 26, the surface normal of which is aligned parallel to the extension curve 10.

Depending on the production method for the manipulator section 2, in particular when using a generative production method such as selective laser sintering, the support rings 23 and/or the webs 24 may also have recesses in certain areas, for example in the manner of a honeycomb structure, in order to ensure quicker production and lower weight with substantially the same stability.

As disclosed by the sectional view of FIG. 3, the fluid chambers 20 mounted integrally on the connecting plate 19 have a considerably lower wall thickness than the support rings 23 and the webs 24. By way of example the fluid chambers 20 are made with a constant wall thickness over their entire length and therefore have a continuous elastically deformable wall section 25. The exemplary wall section 25 is executed in the form of a bellows, rotation-symmetric with a double-S-shaped contour in the neutral position as shown. In this way, a large change in volume of the fluid chamber 20 may be obtained when the fluid chamber 20 is supplied with a pressurised fluid, in particular compressed air. During the change in volume an elastic deformation of the wall section 25 takes place, leading to a change in length of the fluid chamber 20 concerned. Because of the kinematic coupling of the fluid chambers 20, for example three, of each manipulator segment 5 by means of the connecting plate 19, a tilting of the connecting plate 19 of the manipulator segment 5 bordering the end sections of the fluid chambers 20 or a linear movement of the connecting plate 19 may be obtained. If one or two fluid chambers 20 are subjected to uniform pressure, they undergo a change in length, while the remaining two fluid chambers 20 or the remaining fluid chamber 20 undergo at least virtually no change in length owing to the elasticity properties of the wall section 25. Because of this, the connecting plate 19 is tilted relative to adjacent connecting plates 19. If all three fluid chambers 20 are subjected to the same fluidic pressure, then all three fluid chambers 20 also undergo an identical change in length, so that a linear relative movement of adjacent connecting plates 19 is generated.

In the present embodiment of the manipulator section 2, the fluid chambers 20 of the adjacent manipulator segments 5, arranged consecutively along the extension curve 10, are connected so as to communicate with one another, so as to form a common pressure chamber 28. In an embodiment of a manipulator section which is not illustrated the three, for example, fluid chambers of a manipulator segment are in each case fluidically separate, and may be subjected to fluidic pressure separately from fluid chambers of adjacent manipulator segments.

The manipulator section 2 shown in FIGS. 2 and 3 forms the proximal end of the manipulator 1 shown in FIG. 1 and has for this purpose an anchor plate 29 which is in the form of a manipulator segment 5 and similarly carries three fluid chambers 20. At one end face which faces outwards, the anchor plate 29 is designed for attachment to an anchoring surface, not shown. The anchoring surface may be for example an end section of an industrial robot or a rigid machine frame or a surface of a vehicle. Made in the anchor plate 29 for each of the pressure chambers 28 is a fluidic connection 30, here in the form of a drilled hole, and to which a compressed-air hose 17—not shown—may be connected.

Figure 4:
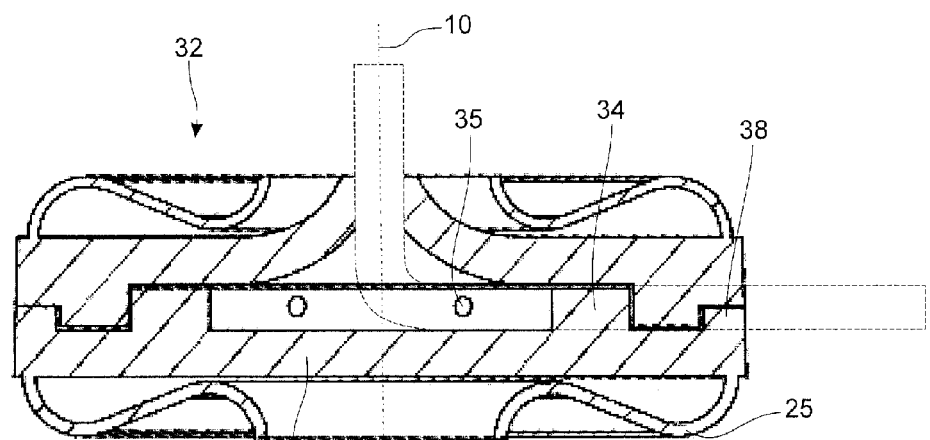
FIG. 4 a sectioned detail of a coupling for the connection of adjacent manipulator sections FIG. 5 a sectioned second embodiment of a manipulator section, and FIG. 6 a sectioned third embodiment of a manipulator section.

Formed at an end section, opposite the anchor plate 29, of the manipulator section 2 shown in FIGS. 2 and 3, is a first coupling 31 which is provided for connection to a second coupling 32 shown as a detail in FIG. 4. The first coupling 31 has a similar contour to the connecting plate 19, with cover discs 33 provided instead of support rings 23. These cover discs each seal off the adjacent fluid chamber 20. Provided on an outwards facing top side of the first coupling 31 are connecting rings 34. The connecting rings 34 are for example arranged concentric to the fluid chambers 20, having here in each case four tapped holes 35 running in the radial direction and by way of example arranged with the same angular division. With a continuous centring collar 36 running on the radial outside and here concentric to the fluid chamber 20, the connecting rings 34 bound a locating slot 37.

The second coupling 32 of the manipulator segment, not illustrated, which is provided for coupling to the manipulator segment 2 shown in FIGS. 2 and 3, comprises a centring ring 38 which is provided for location in the locating slot 37, as shown in the sectional view according to FIG. 4. The centring ring 38 has through holes, not shown, running coaxially to the tapped holes 35 and allowing a screwed connection of the two couplings 31 and 32. To allow access to the screw heads of the screws, not illustrated, which are used for connection of the couplings 31, 32, semi-cylindrical recesses 39 are provided on the centring collar 36 and in a similar manner on an end face, not depicted, of the second coupling 32. Formed on the first coupling is a semi-cylindrical hose duct 40, passing through the centring collar 36 and the connecting ring 34, which is also similarly provided, in a manner not illustrated, in the second coupling 32. The hose duct 40 makes possible the feeding of a compressed air hose indicated by broken lines in FIG. 4, through an entry hole 41 of the second coupling 32 into the pressure chamber 28 of the manipulator segment 2. At the same time the compressed-air hose 17 is safely locked by the forced curvature between the hose duct 40 and the entry hole 41.

Figure 5:
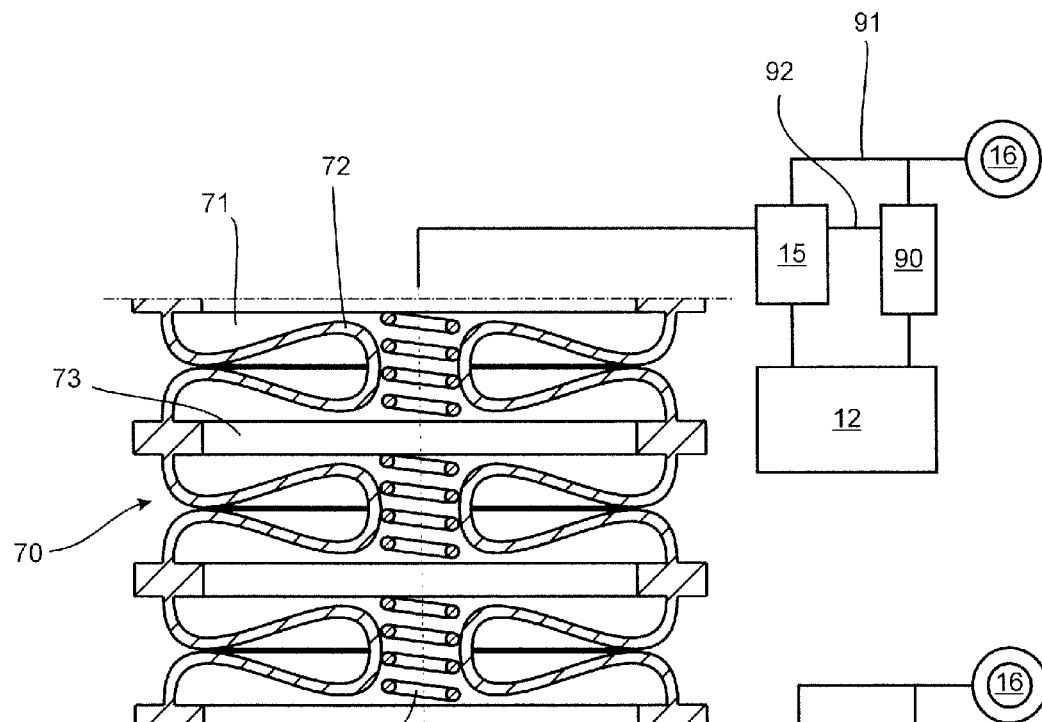
Figure 6:
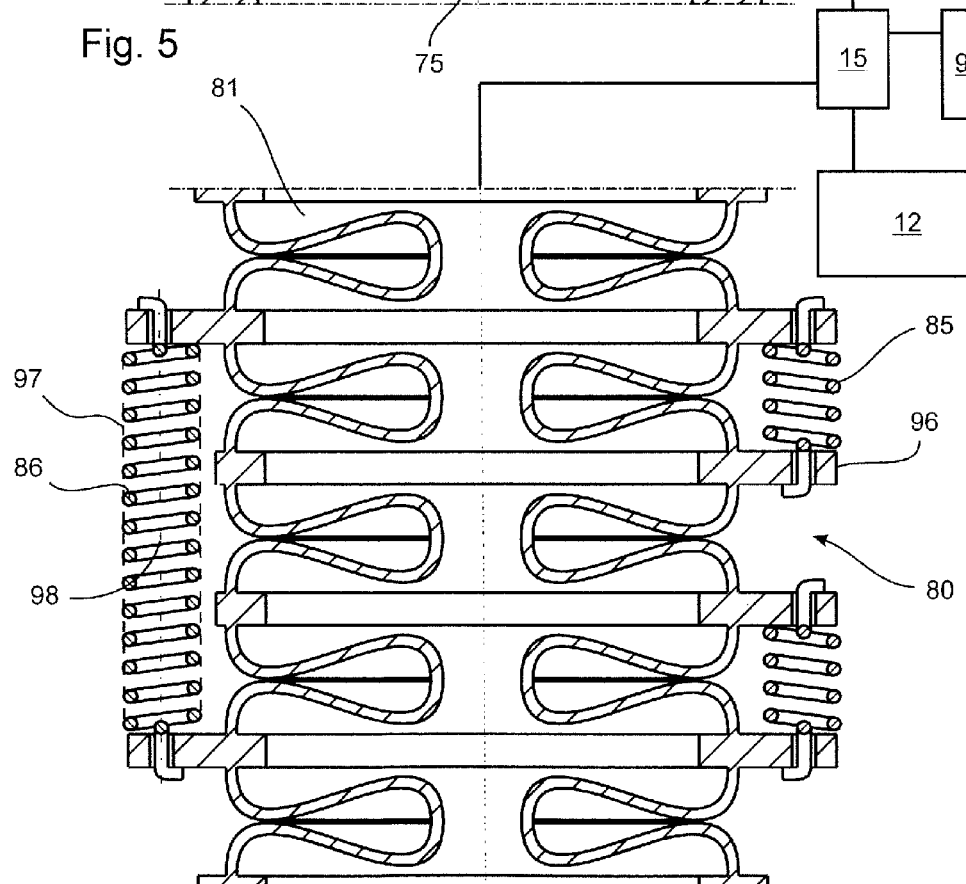

The manipulator segments 70, 80 shown in FIGS. 5 and 6 in cutaway form are made up in the same manner as the manipulator sections 2, 34 shown in FIGS. 1 to 3 from one-piece, lined-up fluid chambers 71, 81. In the case of the manipulator segment 70, spring devices 75 are provided in the fluid chambers 71, in each case extending between the connecting plates 73 and for example made integral with the connecting plates 73 and the flexible wall sections 72. The spring devices 75 are for example in the form of helical tension springs which introduce tensile forces into respectively adjacent connecting plates 73. Preferably the spring devices 75 are designed so that they have a pre-tension even in the depicted rest position of the fluid chambers 71, which is opposite to an expansion movement generated by application of pressure to the fluid chambers 71. During such application of pressure to the fluid chambers 71, the latter extend axially along the extension curve 10, which also leads to an extension of the spring devices 75, their inner tension being thereby increased so that the tensile forces between adjacent connecting plates 73 also increase, in particular linearly. In his way the desired restoring force is exerted on the respective fluid chambers 71.

Fluid supply to the fluid chambers 71 is effected by the arrangement already described in connection with FIG. 1, comprising the control unit 12, valve device 15, compressed air source 16 and compressed-air hose 17. In the embodiment shown in FIG. 5, a partial vacuum device 90 is also provided, which may for example be constructed according to the ejector principle. Like the valve device 15, the partial vacuum device 90 is electrically linked by connecting lines 11 to the control unit 12 and connected to the supply line 91 coming from the compressed air source 16. The partial vacuum device 90 is preferably equipped with an internal valve, not shown, to block or release the compressed air made available over the supply line 91, so that a partial vacuum may be provided through the partial vacuum line 82 to the air outlet connection of the valve device 15, depending on a switching signal from the control unit 12 to the partial vacuum device 90.

For example the partial vacuum device 90 is activated by the control unit 12 to provide a partial vacuum, if the fluid chambers 71 connected fluidically to the valve device 15 are to be vented, in order to return from an expanded length position, not depicted, to the rest position shown in FIG. 5. The partial vacuum device 90 contributes to more rapid venting of the fluid chambers 71. Provision may also be made for the fluid chambers 71 to be supplied by the partial vacuum device 90 with a partial vacuum which is lower than the pressure of the atmosphere surrounding the manipulator segment 70, in order to obtain thereby a more rapid adoption of the neutral position. In this way, an especially high movement dynamic for the manipulator may be obtained. The spring devices 75 shown in FIG. 5 and the partial vacuum device 90 may be attached to the relevant manipulator segment 70 in combination or individually. The combined example shown in FIG. 5 should not be taken as an indication that these two different restoring means may only be provided together.

The third embodiment of a manipulator segment 80 shown in FIG. 6 has, in contrast to the second embodiment of a manipulator segment 70 as shown in FIG. 5, externally mounted spring devices 85, 86. These spring devices 85, 86 are preferably used alternately, but may also be provided in mixed mode, as shown in FIG. 6. Whereas the spring devices 75 of manipulator segment 70 according to FIG. 5 are made integral with the connecting plates 73 and wall sections 72, in the embodiment according to FIG. 6 a discrete version of the spring devices 85, 86 is provided. For advantageous attachment of the spring devices 85, 86, eyelets 86 protruding at right-angles to the extension curve 10 are provided on the connecting plates 83, each having a drilled hole for form-fitting holding of an end section of the respective spring device 85, 86. The spring devices 85, 86 are for example helical springs with a cylindrical envelope curve 87, the neutral fibre 88 of which has a geometrical course similar to the extension curve 10. As also in the embodiment according to FIG. 5, the fluid supply to the fluid chambers 81 in the embodiment according to FIG. 6 may also be supplemented by a partial vacuum device 90.

The invention claimed is:

1. A fluidically operable manipulator made up of several manipulator segments stacked along an extension curve, each comprising at least one connecting plate and at least two fluidically connecting plate separated fluid chambers spaced apart on the connecting plate at right-angles to the extension curve, wherein each of the fluid chambers has at least one elastically deformable wall section for changing the volume of the fluid chamber on pressurization of the respective fluid chamber with a fluid for a linear movement substantially parallel to the extension curve, and wherein a main extension surface of the connecting plate is provided for an arrangement at least substantially at right-angles to the extension curve, and wherein the two or more fluid chambers are made integral with the connecting plate or plates, and wherein the manipulator segments are made by a generative production method, and wherein cross-sections of the manipulator segments determined by the fluid chambers and the connecting plate are tapered along the extension curve in cross-sectional planes aligned at right-angles to the extension curve.

2. The manipulator according to claim 1, wherein elastically deformable wall sections of the fluid chambers are provided for a connection between adjacent connecting plates.

3. The manipulator according to claim 1, wherein fluid chambers of adjacent manipulator segments arranged along the extension curve are connected so as to communicate with one another.

4. The manipulator according to claim 1, wherein fluid chambers of adjacent manipulator segments arranged along the extension curve are fluidically separated and are controlled separately.

5. The manipulator according to claim 1, wherein at least one guide means to hold a sensor component of a curvature sensor is provided on a radially outer surface of the connecting plate.

6. The manipulator according to claim 1, wherein the connecting plate has, between the fluid chambers, a recess which is designed to feed supply lines along the extension curve and/or the one or more elastically deformable wall sections of the fluid chambers between adjacent connecting plates has a shape of a bellows.

7. The manipulator according to claim 1, wherein the fluid chamber has a linear resistance to deformation for forces aligned parallel to the extension curve, which is less than a linear resistance to deformation for forces aligned at right-angles to the extension curve.

8. The manipulator according to claim 1, wherein several manipulator segments are combined to form a manipulator section which has on at least one end section a coupling designed for the attachment of a corresponding coupling of another manipulator section.

9. The manipulator according to claim 7, wherein adjacent manipulator sections have at least two separately controllable fluid chambers.

10. The manipulator according to claim 1, wherein the fluidically connected fluid chambers are assigned at least one valve device.

11. The manipulator according to claim 10, wherein the valve devices are linked electrically to a control unit, which is designed to control the valve devices and, by means of at least one curvature sensor assigned to at least one manipulator section, is set up for position control of an end section of the manipulator section.

12. The manipulator according to claim 1, wherein at least one fluid chamber is assigned restoring means for assisting a restoring movement of the fluid chamber against an expansion movement of the flexible wall section caused by the application of pressure.

13. The manipulator according to claim 12, wherein the restoring means provides restoring forces which act within the fluid chambers and/or between adjacent fluid chambers and/or the restoring means include at least one spring device, attached inside the fluid chambers.

14. The manipulator according to claim 12, wherein the restoring means comprise at least one spring device which connects adjacent fluid chambers and/or connecting plates with one another.

15. The manipulator according to claim 13, wherein the spring device has an envelope geometry with a neutral fibre, which is made geometrically similar to a corresponding section of the extension curve.

16. The manipulator according to claim 13, wherein mounting areas are provided on the fluid chambers and/or the connecting plates for attachment of the spring devices.

17. A fluidically operable manipulator made up of several manipulator segments stacked along an extension curve, each comprising at least one connecting plate and at least two fluidically connecting plate separated fluid chambers spaced apart on the connecting plate at right-angles to the extension curve, wherein each of the fluid chambers has at least one elastically deformable wall section for changing the volume of the fluid chamber on pressurization of the respective fluid chamber with a fluid for a linear movement substantially parallel to the extension curve, and wherein a main extension surface of the connecting plate is provided for an arrangement at least substantially at right-angles to the extension curve, and wherein the two or more fluid chambers are made integral with the connecting plate or plates, and wherein at least one fluid chamber is assigned restoring means for assisting a restoring movement of the fluid chamber against an expansion movement of the flexible wall section caused by the application of pressure, and wherein the restoring means provides restoring forces which act within the fluid chambers and/or between adjacent fluid chambers and the restoring means include at least one spring device, attached inside the fluid chambers, and according to claim 13, wherein the spring devices are integral with at least one fluid chamber and/or connecting plate and/or the restoring means include a partial vacuum device for providing a partial vacuum at one or more of the fluid chambers.

18. The manipulator according to claim 17, wherein the partial vacuum device has a fluidic connection with an outlet air duct of the valve device to allow partial vacuum pressurization of the fluid chamber depending on the valve position.

19. The manipulator according to claim 17, wherein the partial vacuum device is controlled by the control unit in order to allow provision of partial vacuum depending on an operating state of the respective valve device.

20. A fluidically operable manipulator made up of several manipulator segments stacked along an extension curve, each manipulator segment comprising:

at least one connecting plate having a main extension surface substantially at right-angles to the extension curve; and at least one elastically deformable bellows-shaped wall section integrally formed with the extension surface of the at least one connecting plate, the at least one elastically deformable wall section, together with the at least one connecting plate, defining at least two fluidically connecting plate separated fluid chambers spaced apart on the connecting plate at right-angles to the extension curve, the fluid chambers increasing in length in a direction substantially parallel to the extension curve upon pressurization with a fluid for a linear movement of the manipulator segments substantially parallel to the extension curve.

21. The manipulator according to claim 20, wherein the at least one elastically deformable bellows-shaped wall section comprises a double-S-shaped contour having a first end contiguously formed with the extension surface of the at least one connecting plate and a second end opposite the first end contiguously formed with a connecting plate of an adjacent manipulator segment.

* * * * *